Figure 1:
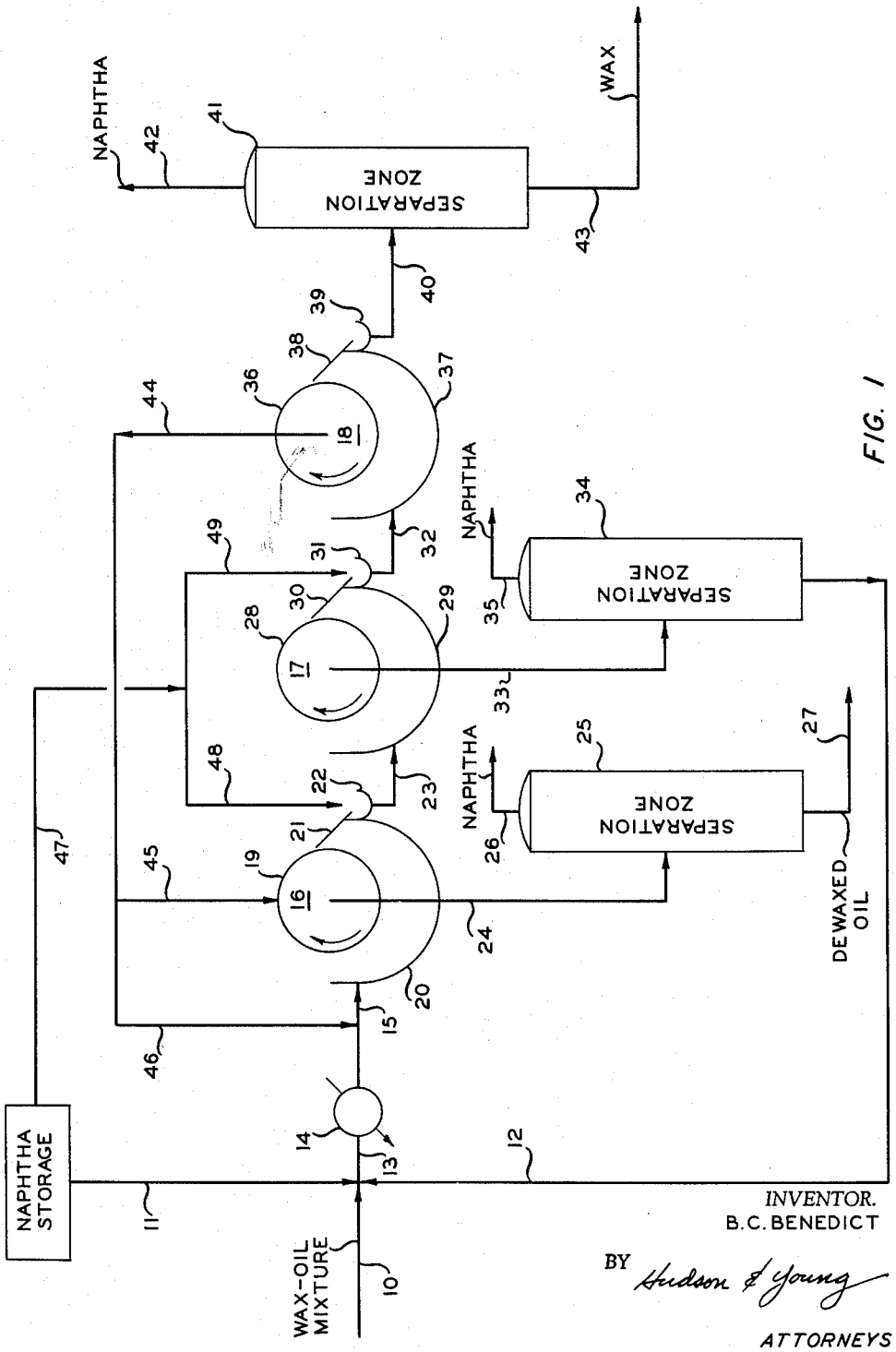

INVENTOR.
B.C. BENEDICT
BY Hudson & Young
ATTORNEYS

June 11, 1963     B. C. BENEDICT     3,093,572
WAX FILTRATION PROCESS
Filed March 14, 1960     3 Sheets-Sheet 2

INVENTOR.
B. C. BENEDICT
BY Hudson & Young
ATTORNEYS

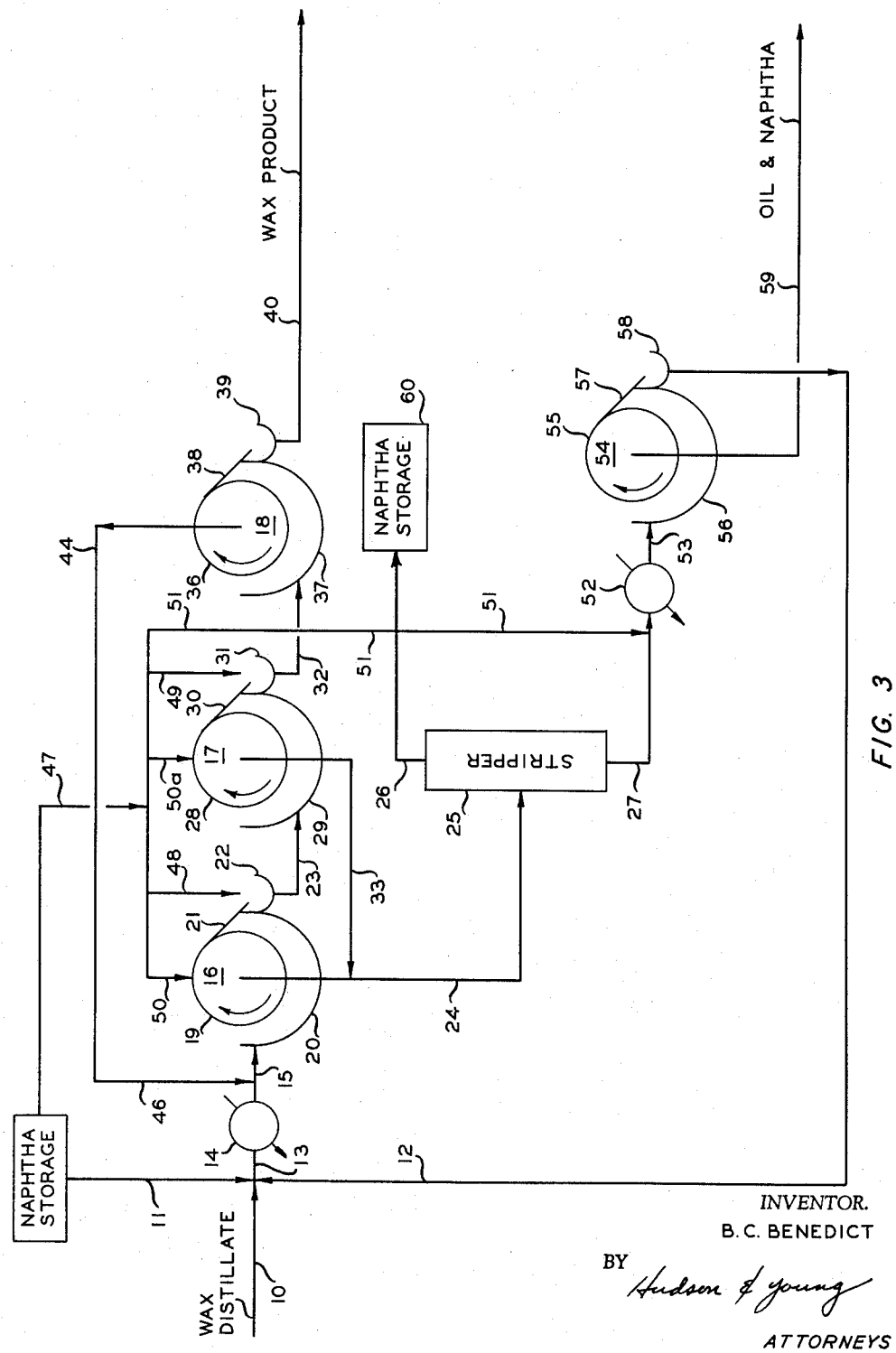

United States Patent Office 3,093,572
Patented June 11, 1963

3,093,572
WAX FILTRATION PROCESS
Bruce C. Benedict, Bartlesville, Okla., assignor to Phillips Petroleum Company, a corporation of Delaware
Filed Mar. 14, 1960, Ser. No. 14,633
1 Claim. (Cl. 208—33)

This invention relates broadly to the separation of solids from a liquid mixture of solids and liquids. In accordance with one aspect, this invention relates to an improved method for the separation of oil from wax concentrates. In accordance with another aspect, this invention relates to an improved method for the separation of wax from oil containing a high percentage of wax in a series of stages in a countercurrent filtration zone.

The production of petroleum wax products is generally closely associated with the production of lubricating oils. Since the higher molecular weight paraffins are undesired in lubricating oil because of the poor low temperature properties that they confer, it is generally sought to remove such fractions, that is the waxes, from the lubricating oil. Also, since an oily constituent is generally detrimental in a number of uses for the wax, for example, polishes, etc., an effort is made to substantially free the wax of oil.

The separation of wax and oil has been accomplished in the past by a countercurrent treatment of the wax-oil mixture (wax distillate) with a solvent for the oil, and removal of the wax by filtration. The filtration can be carried out in a plurality of stages upon continuous rotary filters. A hard, rather brittle wax is obtained, since the usual process removes the softer waxey components as well as the oil. The present invention relates to certain refinements and improvements in the removal of oil from wax distillates by filtration which results in a better handling of the solvent in the process and also in a more flexible wax product suitable especially for coating containers used in the dairy industry known as diary wax.

Accordingly, an object of this invention is to provide an improved method for filtering wax from oil fractions containing same.

Another object of this invention is to produce an improved blend of waxes for use on dairy containers.

Another object of this invention is to provide a less expensive solvent for use in the filtration of wax from oils.

Other aspects, objects, as well as the several advantages will become apparent upon a study of the disclosure, the drawings and the appended claims.

In accordance with the present invention, in a method for the separation of wax and oil from a wax concentrate by filtration in the presence of a liquid solvent in a series of filter stages, I strip solvent from the filtrate removed from at least one of the stages and then recycle the stripped filtrate as part of the feed passed to the first stage of the filtration separation. The filter stages employed are so arranged that the filter cake from a proceeding stage is charged to a succeeding stage and filtrate obtained from at least one succeeding stage is passed as part of the feed to a preceding stage. I have found that a filtration operation in accordance with any invention results in a better handling of the solvent in the filtration process and at the same time a more flexible wax product suitable for coating containers, such as used in the dairy industry, is obtained.

In a preferred wax filtration operation according to the invention, I employ three rotary drum vacuum filter stages in series wherein the filter cake from each stage is passed to a succeeding stage and the filtrate from either the second or third stage is returned to either the first or second stage, respectively. The wax concentrate or distillate feed to be filtered is preferably chilled to a temperature of about 35° F., or below. The preferred solvent to be used in the invention comprises naptha having a boiling range from about 275 to about 350° F.

A better understanding of my invention will be obtained upon reference to the accompanying diagrammatic drawings which illustrate three different embodiments of the invention.

The wax-containing feed stock employed in the operations described in the drawings is a wax distillate obtained from a Venezuelan crude. However, wax distillates obtained from other crude oils such as waxey Texas Panhandle crude, asphatic West Kansas crude, low wax Mex-Tex crude, as well as other crude oils, can be effectively utilized in the operations of the invention. Blends of wax distillates obtained from one or more crude oils and a wax distillate that is distilled from blend of waxey crudes can also be employed.

Referring now to FIGURE 1, a wax distillate, introduced by way of conduit 10, is diluted with a naphtha solvent introduced by conduit 11 and a solvent stripped introduced by conduit 12. The viscosity of the wax distillate is adjusted to a suitable value for filtration by the addition of the solvent. Generally, 100 volumes of the wax distillate is diluted with about 20 volumes of a naphtha solvent boiling in the range 275 to 350° F. I prefer to use a naphtha solvent, as defined, although other solvents such as methylethylketone, diethylketone, methyl-n-butylketone, methylisobutylketone, methyl-n-propylketone, acetone-benzol mixture, propane, ethylenedichloride, etc. can also be used.

The diluted wax distillate is passed by way of conduit 13 to chiller 14 wherein the mixture is cooled to a temperature in the range of 25° to 35° F. The wax in the mixture forms a dispersed solid phase in the oil at this temperature. The chilled mixture is passed by way of conduit 15 to the first stage of rotary vacuum filters 16, 17 and 18. Rotary filter 16 comprises rotary drum 19, filter bowl 20, scraper 21 and trough 22. The wax mixture to be filtered is discharged into filter bowl 20. Within filter bow 20 a filter cake of wax is formed on the submerged portion of the rotating drum 19. As shown, drum 19 rotates in a clockwise direction. During continued rotation the filter cake emerges from the filtering mixture and passes under the wash spray 45. The wash spray comprises a portion of the filtrate removed from the third stage filter 18.

The wax cake on rotating vacuum drum 19 is removed by scraper 21 and collected in trough 22, wherein it is slurried with fresh solvent introduced by way of conduit 48. This mixture is then passed as feed to the second rotary filter 17. A filtrate comprising oil and solvent is removed from filter 16 by way of conduit 24 and passed to a separation zone 25. Naphtha solvent is recovered overhead from zone 25 by conduit 26 and passed to storage, not shown. A dewaxed oil product is recovered from zone 25 by conduit 27.

The solvent diluted wax cake recovered from filter 16, which also contains some oil, is subjected to filtering in filter 17 where it undergoes filtration in a manner similar to that in the preceding filter. Filter 17 comprises clockwise rotating drum 28, filter bowl 29, scraper 30 and collection trough 31. The wax cake recovered from filter 17 in trough 31 is diluted with fresh naphtha solvent introduced by way of conduits 47 and 49 before being passed to filter 18.

A filtrate comprising a small amount of wax, oil and solvent is removed from filterd 17 by way of conduit 33 and passed to stripping or separation zone 34. Naphtha solvent is recovered overhead from zone 34 and removed by way of conduit 35 to storage, not shown. The bottoms fraction removed from stripping zone 34, comprises wax, oil and a minor amount of solvent and is returned to feed line 10 by way of conduit 12.

The wax cake recovered from filter 17 and diluted with fresh solvent in trough 31 is passed by way of conduit 32 to third stage filter 18. Filter 18 comprises clockwise rotating drum 36, filter bowl 37, scraper 38 and collecting trough 39. The wax-solvent mixture fed to bowl 37 undergoes filtration in a manner similar to that in the preceding filters 16 and 17. The filter cake is recovered in trough 39 and then passed by way of conduit 40 to separation zone 41. Residual solvent present in the filter cake is recovered overhead by way of conduit 42 and the desired wax product by way of conduit 43. Filtrate comprising a small amount of wax and a relatively large proportion of solvent is recovered from filter 18, by way of conduit 44 and returned as wash and feed to filter 16 by way of conduits 45 and 46, respectively.

In a specific example in accordance with the flow of FIGURE 1, 100 gallons of wax distillate is introduced into the system by conduit 10. The distillate is diluted with 20 gallons of naphtha from conduit 11 and 20 gallons of stripped filtrate recovered from filter 17 and zone 34 introduced by way of conduit 12. The stripped filtrate in conduit 12 contains 4 gallons wax, 14.4 gallons of oil and 1.6 gallons of naphtha. The diluted distillate is chilled to 35° F. and passed in series through the three filters. 152.6 gallons of filtrate obtained from filter 16 is fractionated in zone 25 to remove 90.7 gallons naphtha solvent overhead and recover 61.9 gallons of oil as product. 37.9 gallons of wax product characterized by melting point (ASTM) of 134° F. is recovered from separation zone 41.

Figure 2:
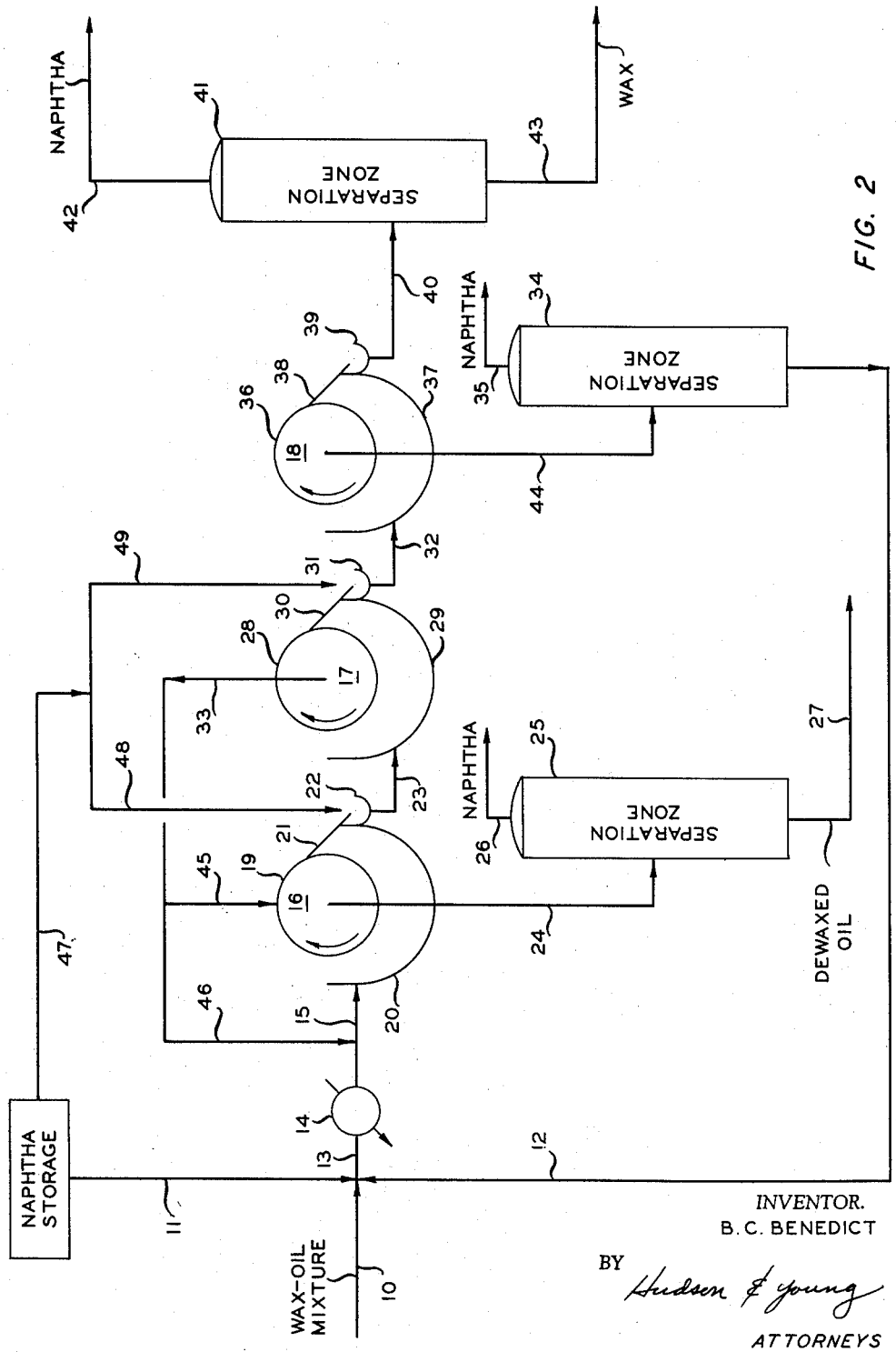

Referring now to FIGURE 2, the wax distillate and the naphtha solvent employed are the same as in FIGURE 1. Also the process flow is substantially the same as in FIGURE 1 and like reference numerals are employed to refer to the same pieces of equipment. The wax distillate in conduit 10 is first diluted with naphtha (20 volumes of naphtha per 100 volumes of feed) from conduit 11 and recycled stripped filtrate by conduit 12 from the third stage filter, chilled to a temperature below about 35° F. and passed to the first stage filter 16. As in FIGURE 1, the filtrate from filter 16 is distilled in zone 25 to remove the naphtha solvent overhead and leaving a lubricating oil stock for further processing in conduit 27.

The wax removed from filter 16 is slurried with fresh naphtha in trough 23, as in FIGURE 1, and fed to the second stage filter 17. The filtrate obtained from the second stage filter is recycled by way of conduit 33 as wash and part of the feed for the first stage filter 16 by way of conduits 45 and 46.

The wax recovered from filter 17 is slurried with fresh naphtha solvent in trough 31 and passed as feed to the third stage filter 18. Wax cake recovered from filter 18 is fractionated in zone 41 into a naphtha solvent overhead stream and a wax product fraction in conduit 43 characterized by a melting point (ASTM) of 134° F. The filtrate recovered from the third stage filter 18 is passed by way of conduit 44 to stripping or separation zone 34. Naphtha solvent is recovered overhead from zone 34 and passed to storage, not shown, and the stripped filtrate comprising wax and a small amount of naphtha is recycled to the first stage filter by way of pipe 12.

By operating in accordance with the previous two described embodiments, i.e., stripping solvent from the filtrate from either the second or third stage filter and recycling the stripped filtrate to the feed stream passed to the first stage filter, I am able to recover additional quantities of wax normally lost in the filtrate streams of the prior art methods of filtration. Another advantage of the previous embodiments described is that the solvent charged to slurry the filter cake from the first and second stage filters can be increased to maximum solvent that will pass through the succeeding filter without lowering the wax yield. Thus, control is given over to the process so that the oil can be washed from the filter without loss of wax yield. Also, the bottoms product from the filtrate stripper does not have to be completely stripped since solvent left in this stream will be primary solvent for the wax distillate feed.

Referring now to FIGURE 3, the wax distillate and naphtha solvent employed are the same as in FIGURES 1 and 2. Also, like reference numerals are utilized to identify the same pieces of equipment as in FIGURES 1 and 2.

A wax distillate (100 volumes) introduced by conduit 10 is diluted with naphtha (20 volumes) introduced by conduit 11 and a wax-naphtha fraction (8 volumes) introduced by conduit 12, chilled to about 35° F. and fed to the first stage filter 16. The filter cake recovered from filter 16 is diluted with solvent introduced by conduit 48 in trough 22 and then passed as feed to the second stage filter 17. The wax filter cake recovered from filter 17 is also diluted with naphtha introduced by conduit 49 and then passed as feed to the third stage filter 18. The wax cake recovered from the third stage filter 18 in pipe 40 is the desired product and is characterized by a melting point (ASTM) of 134° F. The filtrate recovered from filter 18 in conduit 44 comprises wax and a substantial portion of solvent and is returned as part of the feed to the first stage filter 16 by conduit 46.

Naphtha solvent from storage is passed through conduit 47 and used as wash for filters 16 and 17 by sprays 50 and 50a. Naphtha, for dilution of the filter cakes, is mixed with the cakes from the first and second stage filters by conduits 48 and 49.

In accordance with this embodiment of my invention, the filtrates recovered from filters 16 and 17 are passed by way of conduits 24 and 33, respectively, to stripper 25. Naphtha solvent is recovered overhead by way of conduit 26 and passed to naphtha storage 60. The stripped filtrate (oil fraction) removed by conduit 27 from stripper 25 is diluted with fresh naphtha introduced by conduit 51. In this embodiment of the invention, 0.5 volume naphtha per volume of oil are mixed in conduit 27 and passed to chiller 52 wherein the mixture is cooled to a temperature ranging from −10° F. to 0° F., and then fed by way of conduit 53 to filter 54. Filter 54 comprises clockwise rotating vacuum drum 55, filter bowl 56, filter cake scraper 57 and filter cake collector 58. A soft wax is recovered from filter 54 amounting to about 15 gallons per 100 gallons of stripped filtrate treated in filter 54. This soft wax is recycled by way of conduit 12 to the wax distillate feed stock. The oil filtrate recovered from filter 54 by way of conduit 59 can be stripped of naphtha (not shown) and further processed as a lubricating oil.

Wax product obtained from the three previously described embodiments is a superior wax product of high flexibility and can be suitably employed for coating paper containers and other uses. In general, this wax is characterized by a melting point in the range 120–135° F. and is colorless and odorless and is well suited for coating paper milk containers. Also, the yield of wax in accordance with the present invention is increased by approximately 10 percent over that produced in a straight countercurrent process as practiced heretofore. Further, the oil recovered by my process can be satisfactorily employed as a lubricant.

As indicated above, the wax distillate is preferably cooled to a temperature in the range of 25 to 35° F., and a supply of naphtha solvent is also cooled to this same temperature and, as described, used to dilute the oil phase to a viscosity suitable for handling on the filters. Solvent is also added to successive stages of filtration, as described, and used also to wash the solid wax on the filters. In general, an amount of solvent about 4 to 5 times the weight of oil is added prior to entering the filters and another portion is used for washing the filter cake and further dilution. The solvent is recovered in succeeding operations and only a small amount need be added as makeup.

The wax product produced in my invention described above is superior to the wax produced heretofore; however, some soft wax is required for blending to produce a dairy wax. When wax is produced by my process approximately 43 percent of a soft wax, a melting point of 119° F., is blended with 57 percent of wax produced by my process to give a blend comparable to that obtained with a 50-50 blend of wax obtained heretofore with a wax of melting point 119° F. This, obviously, is of considerable importance because the low melting point wax is bought on the open market.

While the invention has been described primarily with the processing or separation of waxey oil and wax concentrates derived from petroleum oils, it should be understood that the invention is applicable to the treatment of other wax mixtures derived from other sources as, for example, animal and vegetable oils. The filtering temperatures employed will depend upon the nature of the charge mixture. However, in general it will range from about 0 to about 65° F., preferably about 25 to 35° F. Also, even though 3 filter units in series have been described in the drawings, it should be realized that more than 3 filters in series can be advantageously used. Also, it is preferred but not necessary that all of the filter stages operate at the same temperature.

As will be evident to those skilled in the art, many modifications and variations of the invention as above set forth can be made without departing from the spirit and scope thereof and therefore only such limitations should be imposed as are indicated in the appended claim.

I claim:

A method for the recovery of a high yield of high flexibility wax product from a crude oil wax distillate stream by continuous filtration in the presence of a liquid solvent in a series of vacuum filter stages, comprising the steps of:

adding to said wax distillate a liquid solvent;

chilling the combined stream of wax distillate and solvent to a temperature in the range of 25-35° F.;

filtering the chilled stream in a first filtration zone to produce a first filtrate and a first filter cake;

diluting said first filter cake with an additional amount of said solvent;

filtering the combined stream of said first filter cake and said added amount of said solvent in a second filtration zone to produce a second filtrate and a second filter cake;

diluting said second filter cake with a second additional amount of said solvent;

filtering the combined stream of said second filter cake and said second additional amount of said solvent in a third filtration zone to produce a third filtrate and a third filter cake;

recycling said third filtrate to said combined stream of wax distillate and solvent;

combining said first and second filtrates;

stripping said combined stream of said first and second filtrates to produce a solvent stream and a stripped filtrate stream;

diluting said stripped filtrate with said solvent;

chilling the combined stream of said stripped filtrate and said solvent to the temperature in the range of $-10°$ F. to 0° F.;

filtering the chilled stream of stripped filtrate and solvent in a fourth filtration zone to produce a fourth filter cake and a fourth filtrate, said fourth filtrate comprising dewaxed oil and solvent;

recycling said fourth filter cake as a soft wax recycle stream to said wax distillate prior to said first filtration zone; and recovering from said third filter said high flexibility wax, said wax characterized by a melting point in the range of 120-135° F.

References Cited in the file of this patent

UNITED STATES PATENTS

| | | |
|---|---|---|
| 2,219,691 | McCarty | Oct. 29, 1940 |
| 2,330,740 | Pokorny et al. | Sept. 28, 1943 |
| 2,356,346 | Packie et al. | Aug. 22, 1944 |
| 2,446,514 | Stewart et al. | Aug. 3, 1948 |
| 2,486,014 | Evans | Oct. 25, 1949 |
| 2,612,465 | Kiersted et al. | Sept. 30, 1952 |
| 2,612,466 | Kiersted et al. | Sept. 30, 1952 |
| 2,734,849 | Gross et al. | Feb. 14, 1956 |
| 2,914,456 | Moore et al. | Nov. 24, 1959 |
| 3,006,839 | Arabian et al. | Oct. 31, 1961 |